United States Patent
Hodgman et al.

(10) Patent No.: US 11,368,474 B2
(45) Date of Patent: Jun. 21, 2022

(54) DETECTING ANOMALOUS INTERNET BEHAVIOR

(71) Applicant: Rapid7, Inc., Boston, MA (US)

(72) Inventors: Roy Hodgman, Cambridge, MA (US); Wah-Kwan Lin, Melrose, MA (US); Vasudha Shivamoggi, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 302 days.

(21) Appl. No.: 15/949,125

(22) Filed: Apr. 10, 2018

(65) Prior Publication Data

US 2019/0230105 A1  Jul. 25, 2019

Related U.S. Application Data

(60) Provisional application No. 62/620,970, filed on Jan. 23, 2018.

(51) Int. Cl.
 *H04L 9/40* (2022.01)
(52) U.S. Cl.
 CPC ...... *H04L 63/1425* (2013.01); *H04L 63/0227* (2013.01)
(58) Field of Classification Search
 CPC .................. H04L 63/1425; H04L 63/0227
 See application file for complete search history.

(56) References Cited

U.S. PATENT DOCUMENTS

| | | | | |
|---|---|---|---|---|
| 8,738,764 B1* | 5/2014 | Schepis | ........ | H04L 63/102 709/224 |
| 9,774,611 B1* | 9/2017 | Zipperer | ........ | H04L 63/1408 |
| 2003/0014665 A1* | 1/2003 | Anderson | ........ | H04L 63/1458 726/4 |
| 2005/0193429 A1* | 9/2005 | Demopoulos | ........ | H04L 63/1408 726/23 |
| 2012/0304022 A1* | 11/2012 | Carey | ........ | G06F 11/0781 714/48 |
| 2014/0090014 A1* | 3/2014 | Crawford | ........ | H04L 63/0245 726/1 |
| 2015/0269050 A1* | 9/2015 | Filimonov | ........ | G06N 7/005 702/183 |
| 2017/0031741 A1* | 2/2017 | Seigel | ........ | H04L 41/069 |
| 2017/0126709 A1* | 5/2017 | Baradaran | ........ | H04L 63/1416 |
| 2017/0223046 A1* | 8/2017 | Singh | ........ | H04L 63/1491 |
| 2018/0004940 A1* | 1/2018 | Ha | ........ | G06F 21/566 |
| 2018/0004948 A1* | 1/2018 | Martin | ........ | G06F 21/566 |
| 2018/0034836 A1* | 2/2018 | Chen | ........ | H04L 63/1425 |
| 2018/0367551 A1* | 12/2018 | Muddu | ........ | G06N 5/022 |
| 2019/0042353 A1* | 2/2019 | Ahad | ........ | G06F 11/3072 |
| 2019/0238575 A1* | 8/2019 | Hodgman | ........ | H04L 63/20 |

* cited by examiner

*Primary Examiner* — Carl G Colin
*Assistant Examiner* — Han Yang
(74) *Attorney, Agent, or Firm* — Robert C. Kowert; Kowert, Hood, Munyon, Rankin & Goetzel, P.C.

(57) ABSTRACT

Analyzing and reporting anomalous internet traffic data by accepting a request for a connection to a virtual security appliance, collecting attribute data about the connection, applying an alert module to the data, and automatically generating an alert concerning an identified incident. An alert system for analyzing and reporting the anomalous internet traffic data. A processor to analyze and report anomalous internet traffic data.

14 Claims, 3 Drawing Sheets

DETECTING ANOMALOUS INTERNET BEHAVIOR

CROSS REFERENCE TO RELATED APPLICATIONS

The present application claims priority to U.S. provisional application No. 62/620,970, filed Jan. 23, 2018, the entire disclosure of which is hereby incorporated by reference as if set forth in its entirety herein.

TECHNICAL FIELD

Embodiments of the invention relate generally to an alert system for analyzing and reporting anomalous internet traffic data and a method of analyzing the data, and more specifically to methods and systems for automatically generating an alert concerning anomalous data.

BACKGROUND

The use of honeypot networks and processors to monitor inbound internet traffic is known. Many of these systems collect data and analyze the data for information about attacks and other anomalous activities.

Existing techniques require manually analyzing data for information about attacks. Though existing techniques may have honeypot networks to study scanning activity, humans must manually mine the resulting data for evidence of an attack. Manual analysis can be time-consuming and inefficient. Furthermore, manual analysis is susceptible to human error. Moreover, manual analysis results in delays, as attacks can only be identified when they are discovered by a researcher. Limited time and resources mean that, in practice, although a signature of an attack may be present and visible in a collected dataset, the signature may only be investigated after the attack has already occurred. In some cases, the signature of the attack may only be investigated sporadically given human resource constraints.

A need exists, therefore, for systems, methods, and devices that overcome this disadvantage.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

In one aspect, embodiments relate to a method of analyzing and reporting anomalous internet traffic data. The method includes accepting, at a processor configured to offer a virtual security appliance, a request for a connection to the virtual security appliance; collecting, using the processor, attribute data about the connection; applying, using the processor, at least one alert module to at least some of the attribute data to identify an incident for reporting; and automatically generating, using the processor, an alert concerning the identified incident.

In some embodiments, the method further includes identifying the incident for reporting comprises identifying at least one anomalous connection attribute in the attribute data.

In some embodiments, the method further includes supplying the alert to a user using a user interface.

In some embodiments, the alert concerning the identified incident includes the time at which the incident occurred.

In some embodiments, the alert module is automatically applied at fixed time intervals.

In some embodiments, the method further includes formatting, using the processor, the attribute data into at least one of a plot, table, or chart.

In some embodiments, the method further includes filtering the collected attribute data and discarding standard attribute data using the processor.

In some embodiments, the method further includes applying, using the processor, a second alert module to at least some of the attribute data to identify a second incident for reporting. In other embodiments, the method further includes automatically generating, using the processor, a second alert concerning the second incident for reporting.

In another aspect, embodiments relate to an alert system for analyzing and reporting anomalous internet traffic data. The alert system includes at least one processor, wherein the processor is configured to offer a virtual security appliance; accept a request for a connection to the virtual security appliance; collect attribute data about the connection; apply at least one alert module to at least some of the attribute data to identify an incident for reporting; and automatically generate an alert concerning the identified incident.

In some embodiments, the processor is further configured to identify at least one anomalous connection attribute in the attribute data.

In some embodiments, the processor is further configured to supply the alert to a user using a user interface.

In some embodiments, the alert concerning the identified incident includes the time at which the incident occurred.

In some embodiments, the processor is configured to apply the alert module at fixed time intervals.

In some embodiments, the processor is further configured to format the collected attribute data into at least one of a plot, table, or chart.

In some embodiments, the processor is further configured to filter the collected attribute data and discard standard attribute data.

In some embodiments, the processor is further configured to apply at least a second alert module to at least some of the attribute data to identify a second incident for reporting.

In some embodiments, the processor is further configured to automatically generate a second alert concerning the second incident for reporting.

In yet another aspect, embodiments relate to a processor configured to analyze and report anomalous internet traffic data. The processor includes a persistent computer-readable program code that, when executed by the processor configured to offer a virtual security appliance, causes the processor to accept a request for a connection to the virtual security appliance; a second persistent computer-readable program code that, when executed by the processor, causes the processor to collect attribute data about the connection; a third persistent computer-readable program code that, when executed by the processor, causes the processor to apply at least one alert module to at least some of the attribute data set to identify an incident for reporting; and a fourth persistent computer-readable program code that, when executed by the processor, causes the processor to automatically generate an alert concerning the identified incident.

In some embodiments, the processor further comprises fifth persistent computer-readable program code that, when executed by the processor, causes the processor to supply the alert to a user using a user interface.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
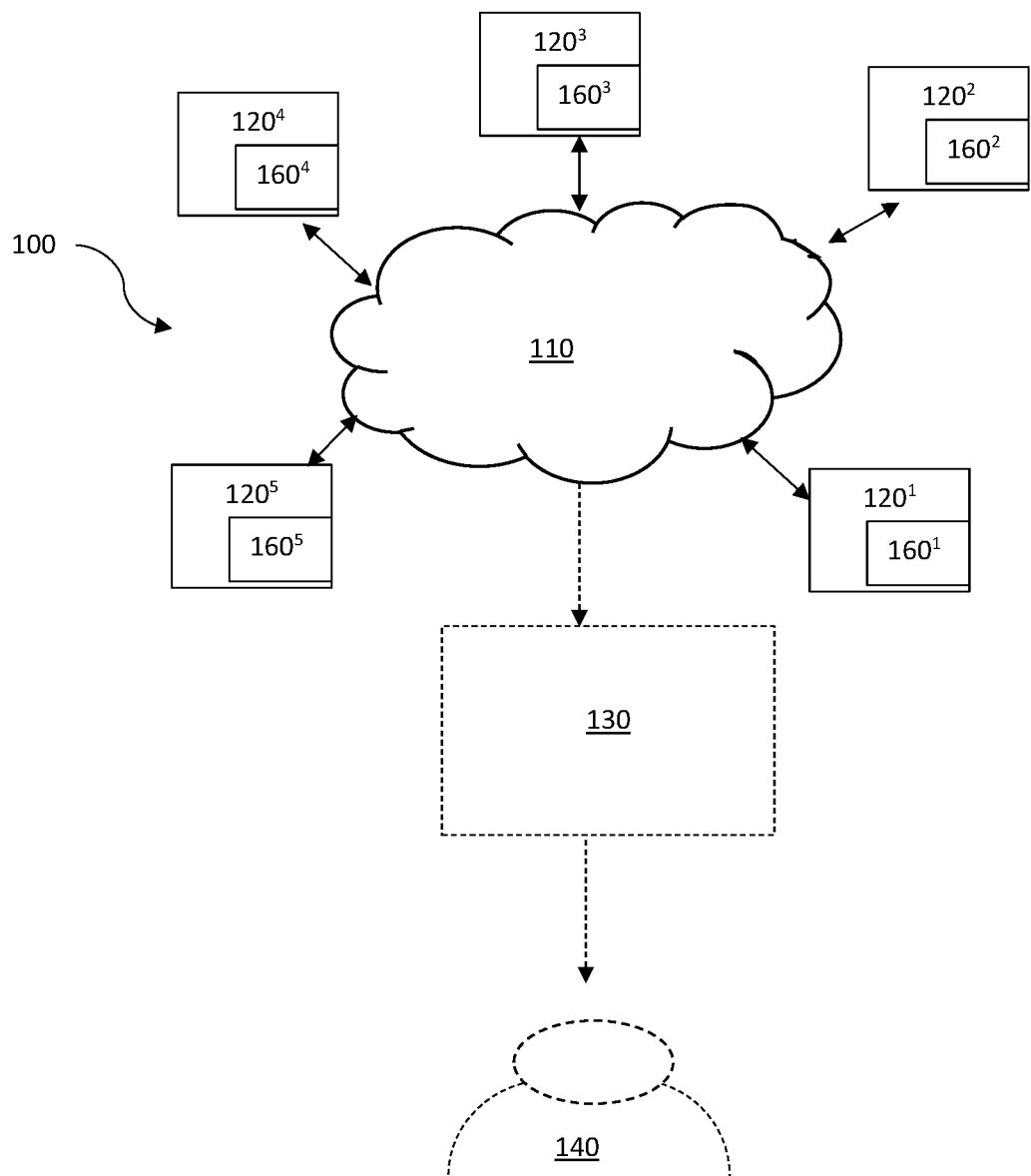
FIG. 1 illustrates a system for analyzing and reporting anomalous internet traffic data, in accordance with one embodiment of the present invention.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments of the invention provide a method and system to identify new cyberattacks as the attacks emerge in real time. Embodiments address a critical need for automating the manual search for signs of attacks. The signs of attacks may include changes occurring in any one of thousands of channels or changes that are difficult or impossible for a human eye to distinguish. Embodiments of the invention monitor attempted connections and corresponding payloads and, when a sign of an attack, such as a change in activity, is detected, embodiments automatically publish alerts.

Embodiments of the invention may automatically detect changes in internet traffic without active user intervention and then, after detecting a change, automatically communicate the detected change to a user. Embodiments of the invention provide a fully automated path from receiving and analyzing internet traffic data to communicating anomalous incidents. Embodiments of the invention focus anomalous behavior of port or payloads. Some embodiments of the invention do not examine the full range of channels to identify anomalous activity.

In embodiments of the invention, a processor is used to monitor and collect data. In other embodiments, set of honeypots continuously monitors indiscriminate scanning behavior on the internet. In embodiments of the invention, collected data may comprise information concerning attempted connections, including port and payload information.

FIG. 1 illustrates a system 100 for analyzing and reporting anomalous internet traffic data, in accordance with embodiments of the present invention. In embodiments of the invention, a processor (not shown) is configured to offer a virtual security appliance 120 and accept a request for a connection to the virtual security appliance 120. In embodiments of the invention, the at least one virtual security appliance 120 is a honeypot. In other embodiments of the invention, there are a plurality of virtual security appliances 120 in communication with each other through, e.g., the Internet 110. As one of ordinary skill would recognize, other embodiments may involve a single processor offering a plurality of virtual security appliances 120.

In normal operation, each virtual security appliance 120 receives connections from various third parties seeking to access the computing resources offered by the virtual security appliance 120. The virtual security appliances 120 collect information regarding these connections for later storage and analysis. In some embodiments, the virtual security appliances 120 are configured to offer honeypot functionality, e.g., presenting services as available on one or more ports and/or emulating the actual functionality offered by these emulated services.

In embodiments of the invention, each virtual security appliance 120 is associated with an individual alert module 160, which may be integrated into the virtual security appliance 120 or otherwise be in communication with the virtual security appliance 120. In other embodiments of the invention, several virtual security appliances $120^1$, $120^2$, $120^3$, $120^4$, and $120^5$ may be in communication with a single alert module 160. At least one alert module 160 may be configured to analyze the data collected from third-party connections, identify an incident for reporting from the analyzed data and may, in certain embodiments of the invention, be further configured to generate an alert concerning the identified incident.

In certain embodiments of the invention, the generated alert may be a written message, such as a text message, email or pop-up warning, supplied to a user 140 either directly or indirectly. In other embodiments of the invention, a user 140 may be notified about an identified incident with an audio signal.

In certain embodiments of the invention, one or more alert modules 160 are in communication with a hub 130. In embodiments of the invention, the hub 130 receives alerts from at least one alert module 160 at fixed or varying time intervals. For example, in one embodiment of the invention, at least one alert module 160 sends all alerts to the hub 130 once every 24 hours. In other embodiments of the invention, the hub initiates contact with at least one alert module 160 and requests an update from the module 160. In other embodiments of the invention, the hub 130 and alert module (s) 160 interact on an event-driven basis. In certain embodiments, when an alert module 160 detects an anomalous event, the alert module 160 will generate an alert concerning the identified incident and will send that alert to the hub 130. In embodiments of the invention, the hub 130 will provide the received alerts to a user 140 on fixed time intervals. In other embodiments of the invention, the hub 130 will send the alert to a user 140 upon receipt of the alert. In further embodiments of the system, the alert will be automatically sent to a user 140.

In embodiments of the invention, a user 140 can configure the system 100 to send alerts to the user 140 on a schedule or on an event-driven basis. In other embodiments of the invention, a user 140 can adjust the system 100 such that the system 100 may send alerts on a fixed time interval basis at certain times and on an incident basis at other times, or when certain conditions are satisfied. In certain embodiments, the alert may be supplied to a user 140 using a user interface, such as a computer or phone.

In further embodiments of the invention, the alert supplied to a user 140 may include the time at which the identified incident occurred, the source of the third party connection, a record of the data exchanged via the connection, and other relevant information. In embodiments of the invention, the at least one processor may collect attribute data and format the collected data into a plot, table, or chart. In other embodiments of the invention, the at least one processor may format identified incidents into a report, collected into a plot, table, or chart, and may further send the formatted incidents to a user 140.

In embodiments of the invention, a virtual security appliance 120 may be configured to send a message to a user 140 at user-specified time intervals. This message, in certain embodiments, may include all attribute data collected over the user-specified time interval. In other embodiments, the appliance 120 may be further configured to filter the collected attribute data and discard standard, non-anomalous attribute data. In certain embodiments, the appliance 120 may only report anomalous attribute data. In other embodiments, the hub 130 may be configured to filter attribute data collected from all appliances 120 in the system 100.

In some embodiments, attribute data may include metadata about a connection, including but not limited to, the date of the connection, the number of bytes associated with the connection, and source IP. In some embodiments, attribute data may include the content of data sent through a connection.

In certain embodiments of the invention, additional alert modules 160 may be added or deleted from the system 100. These alert modules 160 may be added without interdependencies with other alert modules 160. A user 140 could choose to add an additional alert module 160 to the system 100 while the system is running. In a similar fashion, a user 140 could choose to delete an alert module 160 during the operation of the system 100. For example, in embodiments of the invention, the initial alert modules $160^1$, $160^2$ may be configured to examine anomalies in IP addresses and invalid TCP flags, respectively. If the user 140 determines that an additional alert module $160^3$ is needed to examine anomalies in tunneling activity, the user 140 may add alert module $160^3$ without disabling or otherwise interfering with the system 100 and, specifically, the already existing alert modules $160^1$ and $160^2$. Moreover, if the user 140 determines that the system 100 is producing unnecessary alerts due to a certain alert module $160^1$, the user 140 may delete the alert module $160^1$ without interfering with the other existing alert module $160^2$. The decision to add necessary alert modules 160 or delete unnecessary alert modules 160 may also be determined by a processor according to a predetermined schedule, the ad hoc satisfaction of one or more criteria specified by rules, or as decided by a machine learning system. In various embodiments, the system 100 can similarly add or delete virtual security appliances 120 without interfering with other virtual security appliances 120.

Figure 2:
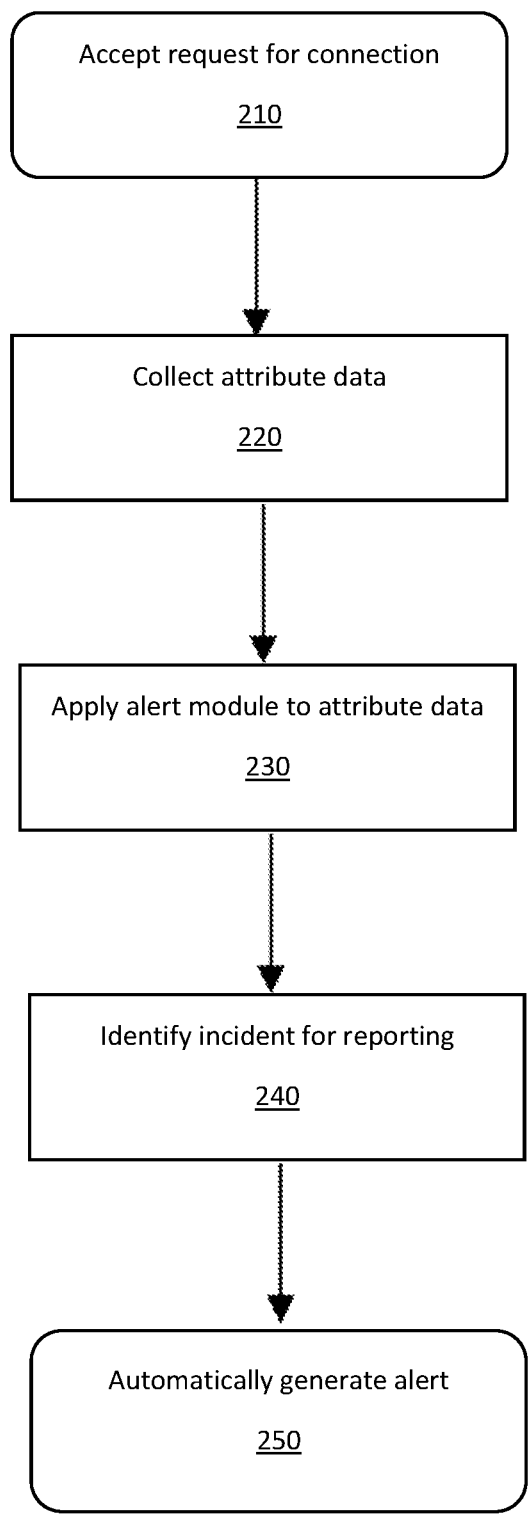
FIG. 2 is a flowchart of a method to analyze and report anomalous internet traffic data, in accordance with one embodiment of the present invention.

FIG. 2 is a flowchart of a method to analyze and report anomalous internet traffic data, in accordance with embodiments of the present invention. Embodiments of the method use a processor configured to offer a virtual security appliance. In embodiments, the processor accepts a request for a connection to the virtual security appliance 210. After accepting such a request, the processor is used to collect attribute data 220 about the connection. In certain embodiments, honeypots are used to collect attribute data 220 about the connection. In certain embodiments, at least one alert module may be used to examine at least a subset of the collected attribute data 230 and identify an incident for reporting 240. In other embodiments, independent and modular alert modules may examine different subsets of the collected attribute data 230. In certain embodiments, a processor is used to filter the collected attribute data 230 and discard standard attribute data before identifying an incident for reporting 240.

For example, in certain embodiments, alert modules may be configured to examine anomalies in IP ports, anomalies in IP addresses, invalid TCP flags, tunneling activity, server connection timings, connection duration, size of connection, known exploits, the content associated with a connection, abnormal terminations, and improper handshakes, among other anomalies. In some embodiments, alert modules may be configured to detect anomalous increases in activity during certain time windows. For example, alert modules may be configured to detect increased activity in work-related servers when employees are not expected to be active. In further embodiments, alert modules may be configured to detect anomalous trends in server connection behavior, including detecting sustained constant connections in a channel which previously lacked traffic. In other embodiments of the invention, alert modules may be configured to examine and identify an anomalous connection attribute in the collected attribute data.

In certain embodiments, at least one alert module examines the collected attribute data and identifies an incident for reporting 240. The alert module may continuously examine the collected attribute data to identify incidents for reporting 240 or, in alternate embodiments, the alert module is automatically applied at fixed time intervals. In certain embodiments, multiple alert modules may detect an incident for reporting 240. In embodiments of the invention, including embodiments with multiple alert modules, only one alert module must detect an incident for reporting 250 before proceeding to the next step. In embodiments of the invention, because alert modules are examining different facets of collected attribute data, some facets of data may not register as anomalous.

In certain embodiments of the invention, additional alert modules may be added without interdependencies between other alert modules. For example, in certain embodiments, a user may determine upon receiving the automatically generated alert 250 that the alert modules should be configured to detect anomalies in IP addresses, in addition to detecting invalid TCP flags and anomalies in tunneling activity. A user may then, in certain embodiments, proceed to add an alert module which would be configured to detect incidents for reporting 240 which concerned anomalies in IP addresses. Alerts would then be automatically generated 250 for the three alert modules in accordance with certain embodiments of the invention. This addition of the third alert module would not interfere with the already present alert modules and, in certain embodiments, the three alert modules would operate independently. Furthermore, if a user later decided to delete an alert module after determining the received automatically generated alerts 250 were unnecessary, a user may delete one alert module without interfering with the other existing alert modules. The decision to add necessary alert modules or delete unnecessary alert modules may also be determined by a processor according to a predetermined schedule, the ad hoc satisfaction of one or more criteria specified by rules, or as decided by a machine learning system.

In some embodiments, a user may decide to tune the frequency of an alert module such that the alert module would generate alerts 250 more or less frequently. For example, if a certain alert module should generate alerts 250 twice a day, rather than once every 24 hours, a user may change the frequency of alert generation 250 for a specific alert module. Conversely, in embodiments, if a certain alert module should generate alerts 250 less frequently than other alert modules, a user may alter the frequency of alert generation 250 to reduce the frequency of alerts from the specific alert module.

In some embodiments, all alert modules operate independently with respect to the other alert modules.

In embodiments of the invention, at least one incident for reporting is detected by at least one alert module. The incident for reporting may then be formatted, in accordance with certain embodiments of the invention, such that it may be sent out as an alert to users 250. In embodiments of the invention, information about the incident for reporting may be formatted into plots, tables, or other data representation that a user could use to further analyze the data. In some embodiments, this formatting is automatically created. In other embodiments of the invention, certain alert modules are configured to generate specifically formatted messages when they detect at least one incident for reporting, based on the type and facet of data the alert module examines.

In embodiments, incidents for reporting are translated into notification messages 250 in the form of an automatically generated alert. The message may be sent out to subscribers, in certain embodiments, to notify subscribers about the discovered event. In other embodiments, a subset of individuals responsible for monitoring the detection system may receive a generated alert. In embodiments of the invention, the method step 250 is the first step wherein a human is contacted.

In embodiments of the invention, steps 210-250 are automatic. In some embodiments of the invention, once a notification message is sent out 250 to a subset of users, those users may forward the notification message to additional users or further investigate the notification message. In embodiments of the invention, the notification message may contain only information about ports and payloads which are behaving anomalously. In some embodiments of the invention, such as in the case of a leaderboard artifact, a user may receive an automatically generated message 250 which contains a high-level summary. In other embodiments, a user may receive an automatically generated message 250 which only contains information or data which was determined to be anomalous.

In some embodiments, the notification message is supplied to at least one user using a user interface. In some embodiments, the notification message may include the time at which the incident occurred. In other embodiments, the notification may include the time at which the incident was detected.

In other embodiments of the invention, an alert system for analyzing and reporting anomalous internet traffic data uses a processor to offer a virtual security appliance, accept a request for a connection to the virtual security appliance, and collect attribute data about the connection. In embodiments of the invention, at least one alert module is applied to some of the collected attribute data to identify an incident for reporting and an alert is automatically generated concerning the identified incident. In certain embodiments of the invention, the collected attribute data is filtered and standard attribute data is discarded.

Embodiments of the invention may use a time-series approach alert module. In embodiments using a time-series approach alert module, the alert modules may track connections to particular ports or properties of HTTP payloads. In some embodiments, alert modules may be set manually. In some embodiments, a subset of ports and HTTP payload properties may be manually set with certain user-determined parameters. In some embodiments, these parameters may be adjusted by a user over time. In some embodiments, a user may select a more vulnerable subset of ports to be associated with a specific alert module. In embodiments of the invention, the time when data changes significantly may be flagged by certain alert modules.

Other embodiments of the invention may use a status report alert module. In certain embodiments of the invention, traffic across ports are examined and the number of ports with the largest rise in traffic in a 24-hour period is flagged by the status report alert module. In other embodiments of the invention, this period may be a 6-hour, 12-hour, or 48-hour period. In some embodiments of the invention, the top 5% of ports are flagged. In other embodiments of the invention, the top 1%, 10%, 15%, or 20% of ports are flagged. In other embodiments of the invention, all ports which increase in traffic above a certain predetermined threshold are flagged by the status report alert module. In certain embodiments of the invention, a leaderboard alert regarding the top ports is generated at the end of each set period. This alert is formatted and sent as a notification message 250 to users. In certain embodiments, the alert can serve as a tool for security researchers monitoring periodic incidents of internet traffic on a regular schedule.

In other embodiments of the invention, at least one time-series approach alert modules and at least one status report alert modules are used to collect and monitor attribute data about the connection to the virtual security appliance.

Figure 3:
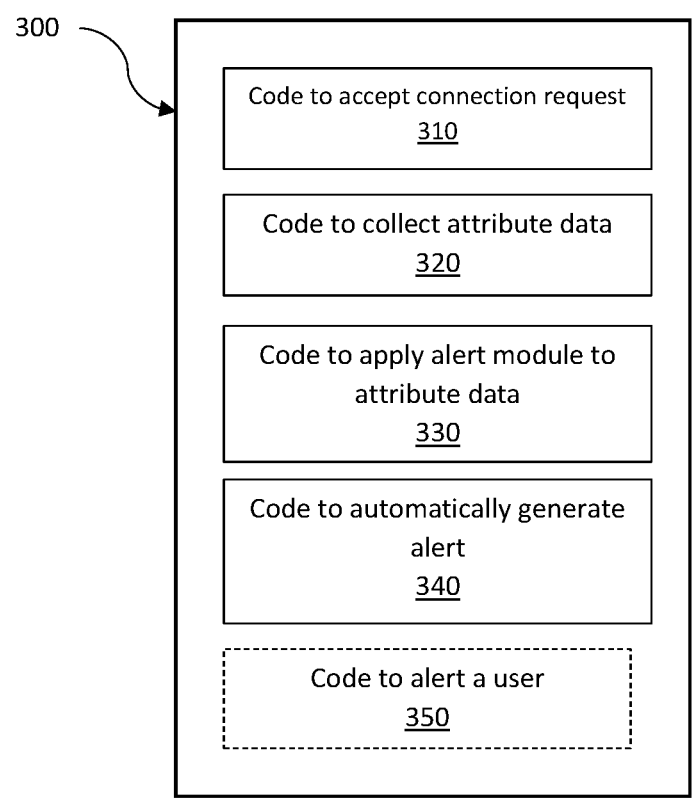
FIG. 3 illustrates a processor configured to analyze and report anomalous internet traffic data, in accordance with one embodiment of the present invention.

FIG. 3 illustrates a processor 300 configured to analyze and report anomalous internet traffic data. In certain embodiments of the invention, the processor 300 comprises a first persistent computer-readable program code 310 that, when executed by the processor 300, causes the processor 300 to accept a request for a connection to the virtual security appliance. In further embodiments, the processor 300 also comprises a second persistent computer-readable program code 320 that, when executed by the processor 300, causes the processor 300 to collect attribute data about the connection established by the first persistent computer-readable program code 310.

In other embodiments, the processor 300 further comprises a third persistent computer-readable program code 330 that, when executed by the processor 300, causes the processor 300 to apply at least one alert module to at least some of the attribute data set to identify an incident for reporting. In further embodiments, the processor 300 also comprises a fourth persistent computer-readable program code 340 that, when executed by the processor 300, causes the processor 300 to automatically generate an alert concerning the identified incident. In certain embodiments of the invention, once the alert is automatically generated, the alert is reported.

In other embodiments, the processor 300 may also comprise a fifth persistent computer-readable program code 350 that, when executed by the processor 300, causes the processor 300 to supply the alert to a user using a user interface. In embodiments of the invention, the processor 300 may supply the alert to a user on a time interval basis or on an incident basis. In other embodiments, the user may specify if the processor 300 will supply the alert to the user on a time interval basis or on an incident basis.

In certain embodiments, the processor 300 may be configured to format the alert in a chart, plot, or table before the fifth persistent computer-readable program code 350 sends the alert to the user. In further embodiments, the alert sent to a user may also include a time-stamp to indicate to the user when the identified incident occurred.

In embodiments of the invention, the processor 300 may execute the first persistent computer-readable program code 310 to cause the processor 300 to accept a request for a connection to a virtual security appliance. In embodiments of the invention, the first persistent computer-readable program code 310 causes the processor 300 to accept a request for a connection to a honeypot. In embodiments of the invention, the first persistent computer-readable code 310 causes the processor 300 to accept a plurality of requests for connections to a plurality of virtual security appliances.

In embodiments, the processor 300 may, after executing the first persistent computer-readable program code 310, execute a second persistent computer-readable program code 320 to collect attribute data about the connection received by the first persistent computer-readable program code 310. This attribute data may be analyzed by the processor 300 or stored for later analysis.

In embodiments of the invention, each virtual security appliance executing on the processor 300 and receiving connections via the first persistent computer-readable program code 310 is associated with at least one alert module implemented by the third persistent computer-readable program code 330. In embodiments of the invention, the third persistent computer-readable program code 330 may implement a single alert module on a plurality of virtual security appliances. In further embodiments, the third persistent computer-readable program code 330 may be further configured to analyze the data collected from the connections received by the first persistent computer-readable code 310.

In further embodiments of the invention, an alert module associated with the third persistent computer-readable program code 330 may identify an incident for reporting from the collected data. In other embodiments, after the incident for reporting is identified, the processor 300 may execute a fourth persistent computer-readable program code 340 which causes the processor 300 to automatically generate an alert concerning the identified incident. In embodiments of the invention, the fourth persistent computer-readable program code 340 may format the collected data regarding the identified incident into a plot, table, or chart.

In certain embodiments of the invention, the generated alert may be a written message, such as a text message, email, or pop-up warning. In embodiments of the invention, the generated alert may include the time at which the identified incident occurred, the source of the third party connection, a record of the data exchanged via the connection, and other relevant information. In further embodiments, a fifth persistent computer-readable program code 350 may send the generated alert to a user or another computer or security system. In other embodiments, the fifth persistent computer-readable program code 350 may notify a user about an identified incident with an audio signal. In further embodiments, the fifth persistent computer-readable program code 350 may send an alert to a user using a user interface, such as a computer or a phone.

In certain embodiments, the fifth persistent computer-readable program code 350 may send a report containing generated alerts to a user at fixed or varying time intervals. For example, in one embodiment of the invention, the fifth persistent computer-readable program code 350 may send alerts to the user once every 24 hours. In other embodiments, a user may request an update from the processor 300. In other embodiments, the fifth computer-readable program code 350 may send alerts to the user on an event-driven basis. In certain embodiments, when the third persistent computer-readable program code 330 identifies an incident for reporting and the fourth persistent computer-readable program code 340 causes the processor 300 to automatically generate an alert, the fifth persistent computer-readable program code 350 will send the alert to the user.

In further embodiments, the fifth persistent computer-readable program code 350 will send a message to a user at user-specified time intervals. This message, in accordance with certain embodiments, may include all attribute data collected over the user-specified time interval. In other embodiments, persistent computer-readable program code (not shown) may filter the collected attribute data and discard standard, non-anomalous attribute data. In certain embodiments, persistent computer-readable program code 350 may only report anomalous attribute data. In other embodiments, the processor 300 may execute persistent computer-readable program code to filter attribute data collected from all appliances associated with the processor 300.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
   performing, by a processor configured to implement a virtual security appliance:
   adding or deleting one or more alert modules to or from a set of alert modules according to a predetermined schedule or as decided by a machine learning system, wherein individual ones of the alert modules in the set is configured to analyze different subsets of attribute data about connections accepted by the virtual security appliance for one or more anomalies, wherein the one or more anomalies includes:
   an IP port of a particular connection,
   a TCP flag of the particular connection,
   a handshake of the particular connection,
   a timing of the particular connection,
   a duration of the particular connection, or
   a termination of the particular connection;
   accepting a request for a connection to the virtual security appliance;
   collecting attribute data about the connection, wherein the attribute data includes date of the connection, a number of bytes associated with the connection, source IP address, or content of data sent through the connection;
   filtering the collected attribute data to discard non-anomalous attribute data about the connection;
   applying the set of alert modules to at least some of the attribute data about the connection to identify an incident; and automatically generating an alert reporting the identified incident.

2. The method of claim 1, wherein identifying the incident comprises identifying at least one anomalous connection attribute in the attribute data.

3. The method of claim 1, further comprising supplying the alert to a user using a user interface.

4. The method of claim 1, wherein the alert concerning the identified incident includes the time at which the incident occurred.

5. The method of claim 1, wherein the alert module is automatically applied at fixed time intervals.

6. The method of claim 1, further comprising formatting, using the processor, the attribute data into at least one of a plot, a table, or a chart.

7. An alert system comprising:
a memory;
at least one processor coupled to the memory, wherein the processor is configured to execute instructions stored on the memory to implement a virtual security appliance and cause the virtual security appliance to:
add or delete one or more alert modules to or from a set of alert modules according to a predetermined schedule or as decided by a machine learning system, wherein individual ones of the alert modules in the set is configured to analyze different subsets of attribute data about connections accepted by the virtual security appliance for one or more anomalies, wherein the one or more anomalies includes:
an IP port of a particular connection,
a TCP flag of the particular connection,
a handshake of the particular connection,
a timing of the particular connection,
a duration of the particular connection, or
a termination of the particular connection;
accept a request for a connection to the virtual security appliance;
collect attribute data about the connection, wherein the attribute data includes date of the connection, a number of bytes associated with the connection, source IP address, or content of data sent through the connection;
filter the collected attribute data to discard non-anomalous attribute data about the connection;
apply at least one alert module in the set to at least some of the attribute data about the connection to identify an incident; and
automatically generate an alert reporting the identified incident.

8. The system of claim 7, wherein the virtual security appliance is further configured to identify at least one anomalous connection attribute in the attribute data.

9. The system of claim 7, wherein the virtual security appliance is further configured to supply the alert to a user using a user interface.

10. The system of claim 7, wherein the alert concerning the identified incident includes the time at which the incident occurred.

11. The system of claim 7, wherein the virtual security appliance is configured to apply the alert module at fixed time intervals.

12. The system of claim 7, wherein the virtual security appliance is further configured to format the collected attribute data into at least one of a plot, a table, or a chart.

13. A non-transitory computer-readable storage medium storing program code that when executed on a processor cause the processor to implement a virtual security appliance and to:
add or delete one or more alert modules to or from a set of alert modules according to a predetermined schedule or as decided by a machine learning system, wherein individual ones of the alert modules in the set is configured to analyze different subsets of attribute data about connections accepted by the virtual security appliance for one or more anomalies, wherein the one or more anomalies includes:
an IP port of a particular connection,
a TCP flag of the particular connection,
a handshake of the particular connection,
a timing of the particular connection,
a duration of the particular connection, or
a termination of the particular connection;
accept a request for a connection to the virtual security appliance;
collect attribute data about the connection, wherein the attribute data includes date of the connection, a number of bytes associated with the connection, source IP address, or content of data sent through the connection;
filter the collected attribute data to discard non-anomalous attribute data about the connection;
apply at least one alert module in the set to a subset of the attribute data about the connection to identify an incident; and
automatically generate an alert reporting the identified incident.

14. The non-transitory computer-readable storage medium of claim 13, wherein the program code when executed on the processor cause the processor to supply the alert to a user using a user interface.

* * * * *